United States Patent
Rose et al.

(10) Patent No.: US 8,131,735 B2
(45) Date of Patent: *Mar. 6, 2012

(54) RAPID AUTOMATIC KEYWORD EXTRACTION FOR INFORMATION RETRIEVAL AND ANALYSIS

(75) Inventors: Stuart J Rose, Richland, WA (US);
Wendy E Cowley, Richland, WA (US);
Vernon L Crow, Richland, WA (US);
Nicholas O Cramer, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 307 days.

This patent is subject to a terminal disclaimer.

(21) Appl. No.: 12/555,916

(22) Filed: Sep. 9, 2009

(65) Prior Publication Data

US 2011/0060747 A1    Mar. 10, 2011

Related U.S. Application Data

(60) Provisional application No. 61/222,737, filed on Jul. 2, 2009.

(51) Int. Cl.
*G06F 17/30* (2006.01)
(52) U.S. Cl. ............................................ 707/750; 704/4
(58) Field of Classification Search .................. 707/102, 707/794, 3; 704/2, 4, 9
See application file for complete search history.

(56) References Cited

U.S. PATENT DOCUMENTS

| | | | | |
|---|---|---|---|---|
| 4,319,085 A | * | 3/1982 | Welch et al. | 704/255 |
| 6,304,841 B1 | * | 10/2001 | Berger et al. | 704/2 |
| 6,886,010 B2 | * | 4/2005 | Kostoff | 1/1 |
| 7,249,012 B2 | * | 7/2007 | Moore | 704/4 |
| 7,275,061 B1 | * | 9/2007 | Kon et al. | 1/1 |
| 7,627,559 B2 | * | 12/2009 | Srivastava et al. | 1/1 |
| 7,860,706 B2 | * | 12/2010 | Abir | 704/4 |
| 7,890,539 B2 | * | 2/2011 | Boschee et al. | 707/794 |
| 2008/0162528 A1 | * | 7/2008 | Jariwala | 707/102 |
| 2009/0094021 A1 | * | 4/2009 | Marvit et al. | 704/9 |

* cited by examiner

*Primary Examiner* — James Trujillo
*Assistant Examiner* — Thong Vu
(74) *Attorney, Agent, or Firm* — Allan C. Tuan (57) ABSTRACT

Methods and systems for rapid automatic keyword extraction for information retrieval and analysis. Embodiments can include parsing words in an individual document by delimiters, stop words, or both in order to identify candidate keywords. Word scores for each word within the candidate keywords are then calculated based on a function of co-occurrence degree, co-occurrence frequency, or both. Based on a function of the word scores for words within the candidate keyword, a keyword score is calculated for each of the candidate keywords. A portion of the candidate keywords are then extracted as keywords based, at least in part, on the candidate keywords having the highest keyword scores.

19 Claims, 10 Drawing Sheets

| Extracted by RAKE | Manually Assigned |
|---|---|
| minimal generating sets | minimal generating sets |
| linear diophantine equations | linear diophantine equations |
| minimal supporting set | |
| minimal set | |
| linear constraints | linear constraints |
| natural numbers | |
| strict inequations | strict inequations |
| nonstrict inequations | nonstrict inequations |
| upper bounds | upper bounds |
| | set of natural numbers |

Compatibility of systems of linear constraints over the set of natural numbers ⎬ 101

Criteria of compatibility of a system of linear Diophantine equations, strict inequations, and nonstrict inequations are considered. Upper bounds for components of a minimal set of solutions and algorithms of construction of minimal generating sets of solutions for all types of systems are given. These citeria and the corresponding algorithms for constructing a minimal supporting set of solutions can be used in solving all the considered types of systems and systems of mixed types. ⎬ 102

<u>Manually assigned keywords:</u>
linear constraints, set of natural numbers, linear Diophantine equations, strict inequations, nonstrict inequations, upper bounds, minimal generating sets ⎬ 103

*Fig. 1*

Compatibility--systems--linear constraints--set--natural numbers --Criteria--compatibility--system--linear Diophantine equations-- strict inequation--nonstrict inequations--Upper bounds-- components--minimal set--solutions--algorithms--minimal geratiing sets--solutions--systems--criteria--corresponding algoeithims--constructing--minimal supporting set--solving-- systems--systems

| word | deg(w) | freq(w) | deg(w)/freq(w) |
|---|---|---|---|
| upper | 2 | 1 | 2 |
| systems | 4 | 4 | 1 |
| system | 1 | 1 | 1 |
| supporting | 3 | 1 | 3 |
| strict | 2 | 1 | 2 |
| solving | 1 | 1 | 1 |
| sets | 3 | 1 | 3 |
| set | 6 | 3 | 2 |
| numbers | 2 | 1 | 2 |
| nonstrict | 2 | 1 | 2 |
| natural | 2 | 1 | 2 |
| minimal | 8 | 3 | 2.5/2.7 |
| linear | 5 | 2 | 2.5 |
| inequations | 4 | 2 | 2 |
| generating | 3 | 1 | 3 |
| equations | 3 | 1 | 3 |
| diophantine | 3 | 1 | 3 |
| criteria | 2 | 2 | 1 |
| corresponding | 2 | 1 | 2 |
| constructing | 1 | 1 | 1 |
| constraints | 2 | 1 | 2 |
| components | 1 | 1 | 1 |
| compatibility | 2 | 2 | 1 |
| bounds | 2 | 1 | 2 |
| algorithms | 2 | 2 | 1.5 |

Fig. 4 minimal generating sets (8.7), linear diophantine equations (8.5), minimal supporting set (7.7), minimal set (4.7), linear constraints (4.5), natural numbers (4), strict inequations(4), nonstrict inequations (4), upper bounds (4), corresponding algorithms (3.5), set (2), algorithms (1.5), compatibility (1), systems (1), criteria (1), system (1), components (1), constructing (1), solving (1)

Fig. 5

| Extracted by RAKE | Manually Assigned |
|---|---|
| minimal generating sets | minimal generating sets |
| linear diophantine equations | linear diophantine equations |
| minimal supporting set | |
| minimal set | |
| linear constraints | linear constraints |
| natural numbers | |
| strict inequations | strict inequations |
| nonstrict inequations | nonstrict inequations |
| upper bounds | upper bounds |
| | set of natural numbers |

*Fig. 6*

| Method | Extracted Keywords | | Correct Keywords | | | Precision | Recall | F-measure |
|---|---|---|---|---|---|---|---|---|
| | Total | Mean | Total | Mean | | | | |
| RAKE (T=.33) | | | | | | | | |
| KA stoplist (df > 10) | 6,052 | 12.1 | 2,037 | 4.1 | | 33.7 | 41.5 | 37.2 |
| Fox stoplist | 7,893 | 15.8 | 2,054 | 4.2 | | 26 | 42.2 | 32.1 |
| TextRank | | | | | | | | |
| Undirected, Co-occ.window=2 | 6,784 | 13.6 | 2,116 | 4.2 | | 31.2 | 43.1 | 36.2 |
| Undirected, Co-occ.window=3 | 6,715 | 13.4 | 1,897 | 3.8 | | 28.2 | 38.6 | 32.6 |
| (Hulth 2003) | | | | | | | | |
| Ngram with tag | 7,815 | 15.6 | 1,973 | 3.9 | | 25.2 | 51.7 | 33.9 |
| NP-chunks with tag | 4,788 | 9.6 | 1,421 | 2.8 | | 29.7 | 37.2 | 33 |
| Pattern with tag | 7,012 | 14 | 1,523 | 3 | | 21.7 | 39.9 | 28.1 |

Fig. 7 the, and, of, a, in, is, for, to, we, this, are, with, as, on, it, an, that, which, by, using, can, paper, from, be, based, has, was, have, or, at, such, also, but, results, proposed, show, new, these, used, however, our, were, when one, not, two, study, present, its, sub, both, then, been, they, all, presented, if, each, approach, where, may, some, more, use, between, into, 1, under, while, over, many, through, addition, well, first, will, there, propose, than, their, 2, most, sup, developed, particular, provides, including, other, how, without, during, article, application, only called, what, since, order, experimental, any

| Method | Stoplist Size | Extracted Keywords | | Correct Keywords | | Mean Precision | Recall | F-measure |
|---|---|---|---|---|---|---|---|---|
| | | Total | Mean | Total | Mean | | | |
| RAKE (T=.33) | | | | | | | | |
| TF stoplist (df > 10) | 1347 | 3,670 | 7.3 | 606 | 1.2 | 16.5 | 12.3 | 14.1 |
| TF stoplist (df > 25) | 527 | 5,563 | 11.1 | 1,032 | 2.1 | 18.6 | 21.0 | 19.7 |
| TF stoplist (df > 50) | 205 | 7,249 | 14.5 | 1,520 | 3.0 | 21.0 | 30.9 | 25.0 |
| RAKE (T=.33) | | | | | | | | |
| TF stoplist (df > 10) | 763 | 6,052 | 12.1 | 2,037 | 4.1 | 33.7 | 41.5 | 37.2 |
| TF stoplist (df > 25) | 325 | 7,079 | 14.2 | 2,103 | 4.3 | 29.7 | 42.8 | 35.1 |
| TF stoplist (df > 50) | 147 | 8,013 | 16.0 | 2,117 | 4.3 | 26.4 | 43.1 | 32.8 |

Fig. 10

| Keyword | Scored by deg(w) | | Scored by deg(w)/freq(w) | |
| --- | --- | --- | --- | --- |
| | edf(w) | rdf(w) | edf(w) | rdf(w) |
| kyoto protocol legall obliged developed countries | 2 | 2 | 2 | 2 |
| eu leader urg russia to ratify kyoto protocol | 2 | 2 | 2 | 2 |
| kyoto protocol on climate change | 2 | 2 | 2 | 2 |
| ratify kyoto protocol | 2 | 2 | 2 | 2 |
| kyoto protocol requires | 2 | 2 | 2 | 2 |
| 1997 kyoto protocol | 2 | 4 | 4 | 4 |
| kyoto protocol | 31 | 44 | 7 | 44 |
| kyoto | 10 | 12 | – | – |
| kyoto accord | 3 | 3 | – | – |
| kyoto pact | 2 | 3 | – | – |
| sign kyoto protocol | 2 | 2 | – | – |
| ratification of the kyoto protocol | 2 | 2 | – | – |
| ratify the kyoto protocol | 2 | 2 | – | – |
| kyoto agreement | 2 | 2 | – | – |

Fig. 11 united states (32), human rights (24), kyoto protocol (22), international space station (18), mugabe (16), space station (14), human rights report (12), greenhouse gas emissions (12), chavez (11), taiwan issue (11), president chavez (10), human rights violations (10), president bush (10), palestinian people (10), prisoners of war (9), president hugo chavez (9), kyoto (8), taiwan (8), israeli government (8), hugo chavez (8), climate change (8), space (8), axis of evil (7), president fernando henrique cardoso (7), palestinian (7), palestinian territories (6), taiwan strait (6), russian news agency interfax (6), prisoners (6), taiwan relations act (6), president robert mugabe (6), presidential election (6), geneva convention (5), palestinian authority (5), venezuelan president hugo chavez (5), chinese president jiang zemin (5), opposition leader morgan tsvangirai (5), french news agency afp (5), bush (5), north korea (5), camp x-ray (5), rights (5), election (5), mainland china (5), al qaeda (5), president (4), south africa (4), global warming (4), bush administration (4), mdc leader (4)

*Fig. 12*

| Topic | Description |
|---|---|
| argentina | economic collapse in Argentina |
| axisofevil | reaction to President Bush's 2002 State of the Union Address |
| guantanamo | U.S. holding prisoners in Guantanamo Bay |
| humanrights | reaction to U.S. State Department report on human rights |
| kyoto | ratification of Kyoto Protocol |
| mugabe | 2002 presidential election in Zimbabwe |
| settlements | Israeli settlements in Gaza and West Bank |
| spacestation | space missions of various countries |
| taiwan | relations between Taiwan and China |
| venezuela | presidential coup in Venezuela |

*Fig. 13* government (147), countries (141), people (125), world (105), report (91), war (85), united states (79), china (71), president (69), iran (60), bush (56), japan (50), law (44), peace (44), policy (43), officials (43), israel (41), zimbabwe (39), taliban (36), prisoners (35), opposition (35), plan (35), president george (34), axis (34), administration (33), detainees (32), treatment (32), states (30), european union (30), palestinians (30), election (29), rights (28), international community (27), military (27), argentina (27), america (27), guantanamo bay (26), official (26), weapons (24), source (24), eu (23), attacks (23), united nations (22), middle east (22), bush administration (22), human rights (21), base (20), minister (20), party (19), north korea (18)

RAPID AUTOMATIC KEYWORD EXTRACTION FOR INFORMATION RETRIEVAL AND ANALYSIS

PRIORITY

This invention claims priority from U.S. Provisional Patent Application No. 61/222,737, entitled "Feature Extraction Methods and Apparatus for Information Retrieval and Analysis," filed Jul. 2, 2009.

STATEMENT REGARDING FEDERALLY SPONSORED RESEARCH OR DEVELOPMENT

This invention was made with Government support under Contract DE-ACO576RL01830 awarded by the U.S. Department of Energy. The Government has certain rights in the invention.

BACKGROUND

Keywords can provide a compact representation of the essential content in a document or a corpus of documents. Keywords are widely used to define queries within information retrieval (IR) systems because they are easy to define, revise, remember, and share. In comparison to mathematical signatures, keywords can be independent of a given corpus and can be applied across multiple corpora and IR systems. Keywords have also been applied to improve the functionality of IR systems and to enrich the presentation of search results. However, despite their utility for analysis, indexing, and retrieval, most documents do not have assigned keywords.

Most of the existing approaches for assigning keywords focus on manual assignment by professional curators who may use a fixed taxonomy, or rely on the author's judgment to provide a representative list. Accordingly, state-of-the-art methods commonly focus on automatically extracting words from documents as an aid to either suggest keywords for a professional indexer or generate summary features for documents that would otherwise be inaccessible. Early approaches to automatically extracting keywords focused on evaluating corpus-level statistics of individual words across the corpus of documents. However, corpus-level approaches can miss important keywords within the corpus that are not statistically discriminating. These corpus-oriented methods can also tend to operate on single words, which can be a limitation because a single word is often used in multiple and different contexts.

Keyword extraction methods that operate on individual documents can be applied to avoid the drawbacks of corpus-oriented methods. However, many of these document-oriented approaches rely on natural language processing and are not highly efficient. Accordingly, a need exists for automatic keyword extraction methods and apparatus that operate from individual documents and that are unsupervised, domain-independent, and language-independent.

SUMMARY

The present invention is based, at least in part, on the observation that keywords frequently contain multiple words but rarely contain standard punctuation or stop words, such as the function words and, the, and of or other words with minimal lexical meaning. A keyword, as used herein, can refer to a sequence of one or more words that provides a compact summary of a document's content and has been applied to improve access for information retrieval and analysis systems. Stop words, as used herein, can refer to words that are considered to be uninformative and/or lexically meaningless. As such, stop words are typically dropped from indexes within information retrieval systems and are not included in various text analyses.

According to one embodiment of the present invention, rapid, automatic, keyword extraction (RAKE) methods and systems can include parsing words in an individual document by delimiters, stop words, or both in order to identify candidate keywords. Co-occurrences of words within these candidate keywords can be meaningful and, thus, are identified. In a preferred embodiment, word co-occurrences are identified without the application of an arbitrarily sized sliding window. Word scores for each word within the candidate keywords are then calculated based on a function of co-occurrence degree, co-occurrence frequency, or both. Based on a function of the word scores for words within the candidate keyword, a keyword score is calculated for each of the candidate keywords. A portion of the candidate keywords are then extracted as keywords based, at least in part, on the candidate keywords having the highest keyword scores.

Co-occurrences of words can be stored within a word co-occurrence graph. A word co-occurrence graph can represent words as nodes and word co-occurrences or word associations as weighted edges between word nodes. The word co-occurrence graph can also be represented or stored in matrix form.

In one embodiment, keyword scores for each candidate keyword are calculated by summing the word scores for each word within the candidate keywords.

In another embodiment, selection of the portion of the candidate keywords to extract as keywords is accomplished by selecting a predetermined number, T, of the candidate keywords having the highest keyword scores. Preferably, T is equal to one-third of the number of candidate keywords.

Embodiments of the present invention can further include identification of adjoining candidate keywords that adjoin one another at least twice in the individual document and in the same order. In such instances, a new candidate keyword can be created from the adjoining candidate keywords and can include any interior stop words.

In preferred embodiments, the keywords that have been extracted from one or more documents can be provided to a stop word list generator and used to generate or refine a list of stop words. An exemplary stop word list generator can be provided keywords and a corpus of documents comprising a plurality of individual documents from which a list of all words can be constructed. The generator can then determine the keyword adjacency frequency of words in the corpus of documents as well as the keyword frequency. Words from the word list are then excluded if the ratio of keyword adjacency frequency to keyword frequency is less than a predetermined value. The generator can then truncate the list based on a predetermined criteria to form the stop word list.

In some embodiments, the individual document is part of a dynamic collection of documents (e.g., a corpus that changes with time). Therefore, regardless of the current state of the corpus to which the individual document belongs, embodiments of the present invention will extract the same keywords. Accordingly, the present invention is not corpus-oriented, but is rather document-oriented, and can be said to be context independent. It can enable analytic methods that characterize changes within a text stream over time. Furthermore, consistent with the present embodiment, the invention can scale to vast collections of documents.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

FIGS. 1-14 show a variety of aspects of the present invention, which can encompass a keyword extraction method that is extremely efficient, operates on individual documents to enable application to dynamic collections, is easily applied to new domains, and operates well on multiple types of documents, particularly those that do not follow specific grammar conventions.

Figure 1:
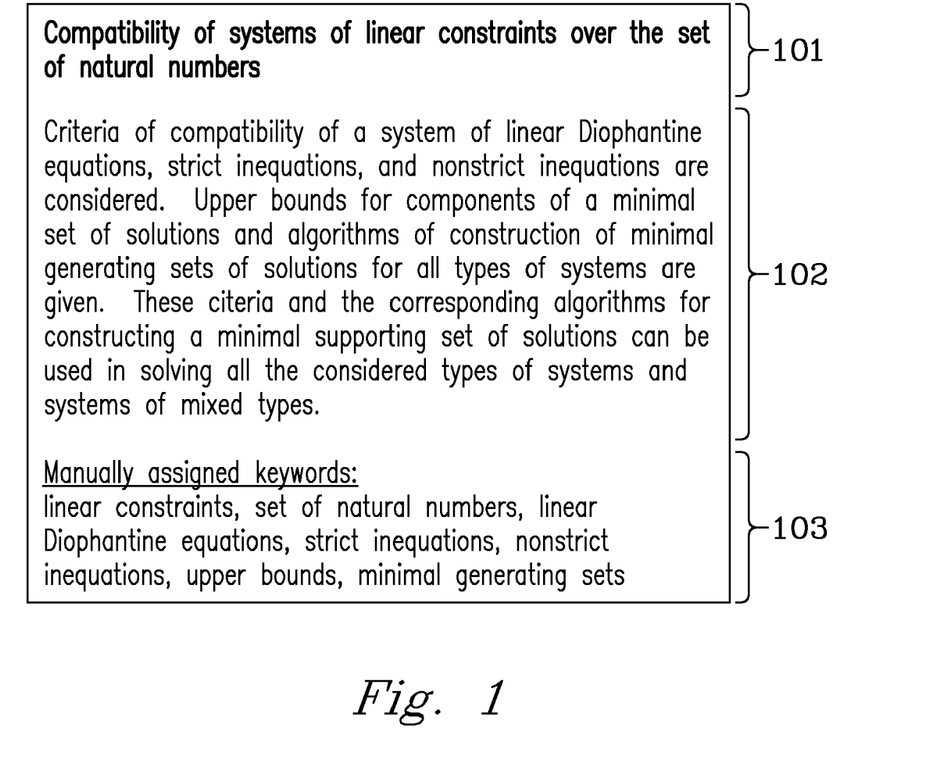
FIG. 1 is an exemplary abstract, from which keywords can be extracted according to embodiments of the present invention.

Referring first to FIG. 1, the title 101 and text 102 for a typical abstract, as well as its manually assigned keywords, are shown. Reviewing the manually assigned keywords 103 for the abstract in FIG. 1, there is only one keyword that contains a stop word (e.g., the word "of" in the phrase set of natural numbers). Stop words are typically eliminated from indexes within IR systems and are not included in various text analyses as they are considered to be uninformative or meaningless. This reasoning is based on the expectation that such words are too frequently and broadly used to aid users in their analyses or search tasks. Words that do carry meaning within a document are described as content bearing and are often referred to as content words.

According to the present embodiments, the input parameters for keyword extraction comprise a list of stop words (or stoplist), a set of phrase delimiters, and a set of word delimiters. The stop words, word delimiters, and phrase delimiters are used to partition the document text into candidate keywords, which can be sequences of content words as they occur in the text. Co-occurrences of words within these candidate keywords are meaningful and allow for the identification of word co-occurrence without the application of an arbitrarily sized sliding window. Word associations are thus measured in a manner that automatically adapts to the style and content of the text, enabling adaptive and fine-grained measurement of word co-occurrences that will be used to score candidate keywords.

Embodiments of the present invention begin keyword extraction on an individual document by parsing its text into a set of candidate keywords. First, the document text is split into an array of words by the specified word delimiters. This array is then split into sequences of contiguous words at phrase delimiters and stop word positions. Words within a sequence are assigned the same position in the text and together are considered a candidate keyword.

Figure 2:
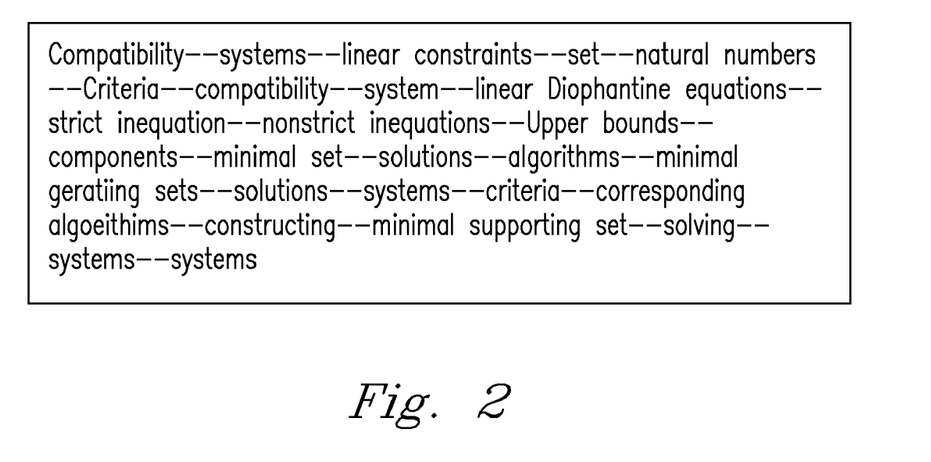
FIG. 2 is a list of candidate keywords extracted from the abstract in FIG. 1 according to embodiments of the present invention.

FIG. 2 shows the candidate keywords in the order that they are parsed from the sample technical abstract shown in FIG. 1. The candidate keyword linear diophantine equations begins after the stop word "of" and ends with a comma. The following word "strict" begins the next candidate keyword strict inequations.

Figure 3:
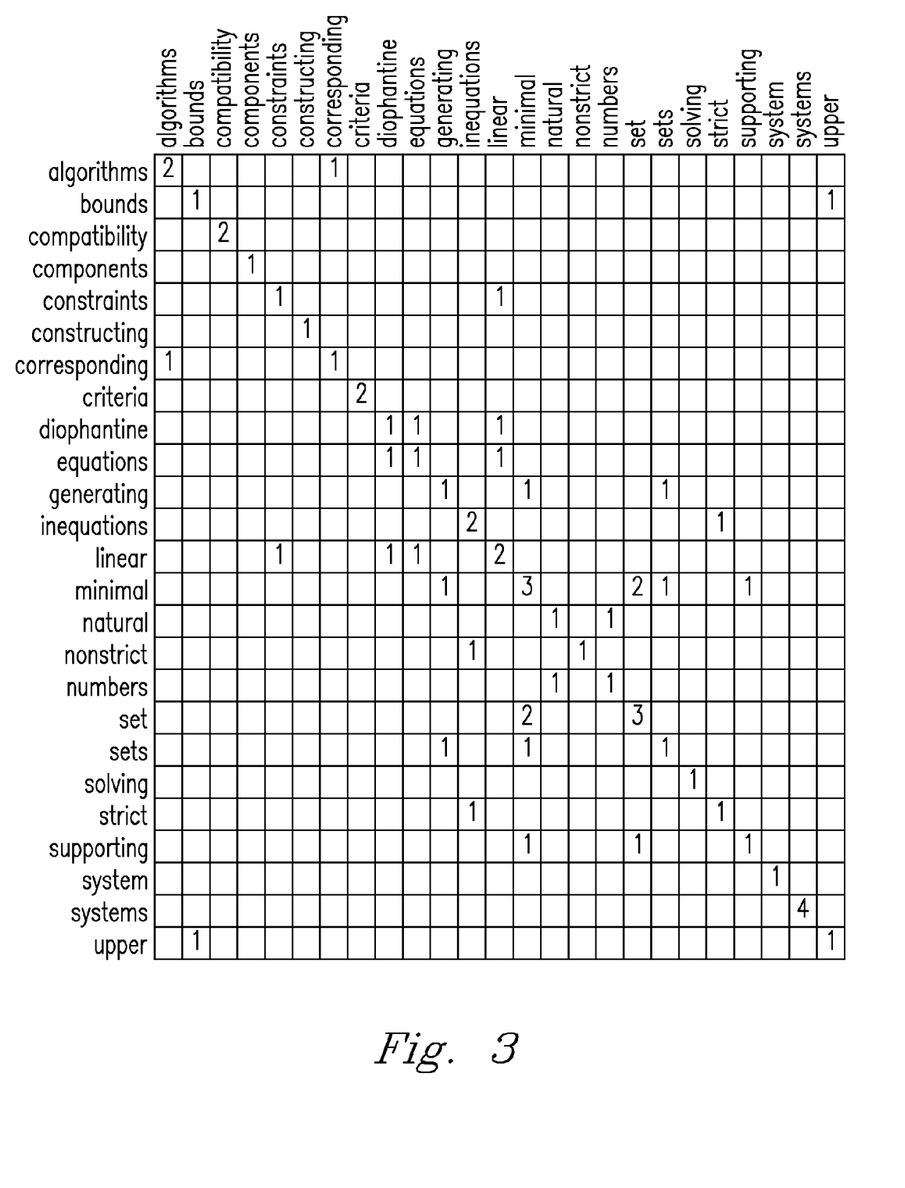
FIG. 3 is a graph of word co-occurrences constructed according to embodiments of the present invention.

After every candidate keyword is identified and a graph of word co-occurrences is completed, which is shown as a matrix in FIG. 3, a keyword score is calculated for each candidate keyword. In this embodiment, the keyword score is defined as the sum of its member word scores. The word co-occurrence graph comprises all of the words occurring within candidate keywords. In the matrix representation of the word co-occurrence graph in FIG. 3, words are arranged along rows and columns And the frequency of word co-occurrences are denoted in the elements of the matrix. Several metrics for calculating word scores exist based on the degree and frequency of word vertices in the word co-occurrence graph, including word frequency (freq(w)), word degree (deg (w)), and ratios of degree to frequency (deg(w)/freq(w).)

Figure 4:
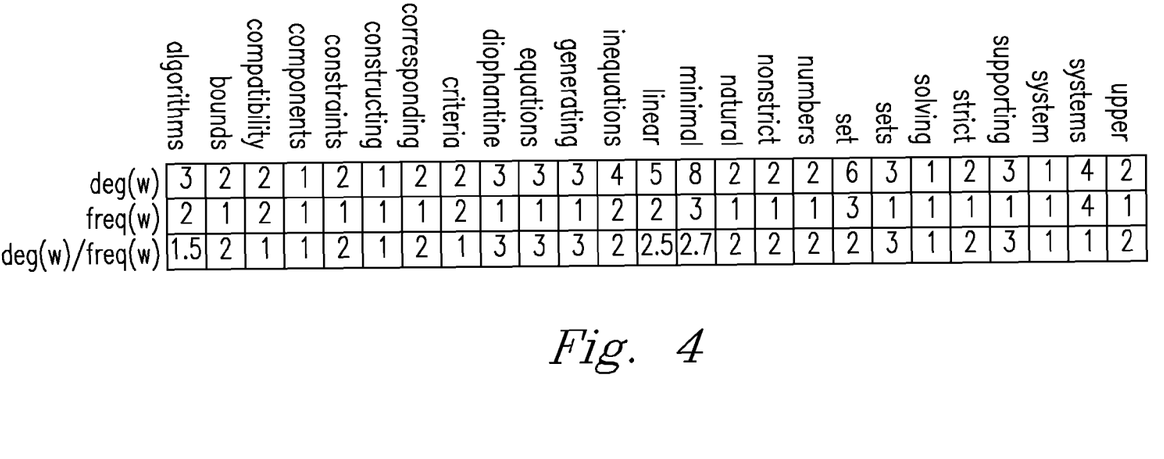
FIG. 4 shows content words from the abstract in FIG. 1 and their word scores, which were determined according to embodiments of the present invention.
Figure 5:
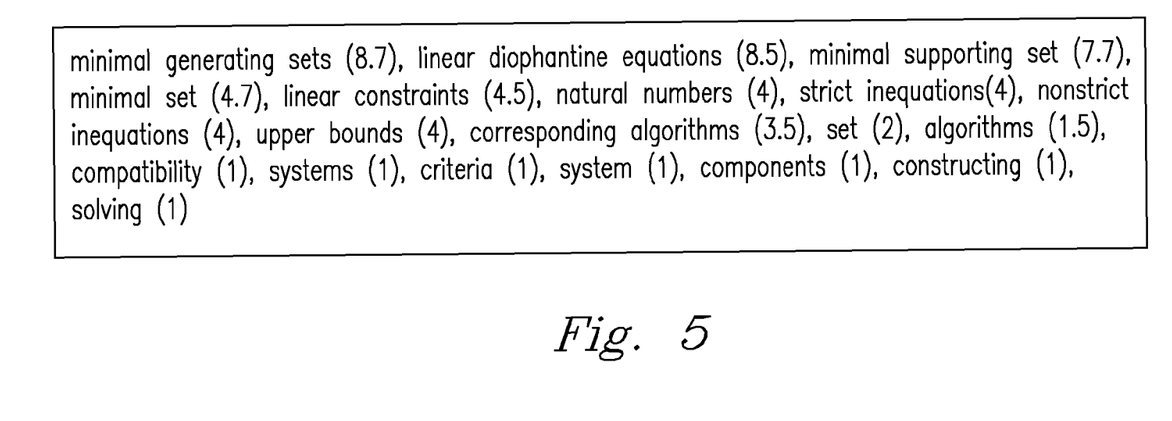
FIG. 5 is a list of candidate keywords and their keyword scores, which were determined according to embodiments of the present invention.

The word scores for each of the content words in the sample abstract are listed in FIG. 4. Typically, deg(w) favors words that occur often and in longer candidate keywords; deg(minimal) scores higher than deg(systems). Words that occur frequently regardless of the number of words with which they co-occur are favored by freq(w); freq(systems) scores higher than freq(minimal). Words that predominantly occur in longer candidate keywords are favored by ratios of deg(w)/freq(w). For example, deg(diophantine)/freq (diophantine) scores higher than deg(linear)/freq(linear). The keyword score for each candidate keyword is computed as the sum of its member word scores. FIG. 5 lists each candidate keyword and its keyword score from the sample abstract using the metric deg(w)/freq(w) to calculate individual word scores.

Because embodiments of the present invention can split candidate keywords by stop words, extracted keywords do not contain interior stop words. In some instances identifying keywords that contain interior stopwords, such as axis of evil, can be desirable and/or beneficial. To find these stopword-containing keywords, embodiments of the present invention can look for pairs of keywords that adjoin one another at least twice in the same document and in the same order. A new candidate keyword is then created as a combination of those keywords and their interior stop words. The score for the new keyword is the sum of its member keyword scores.

Figure 6:
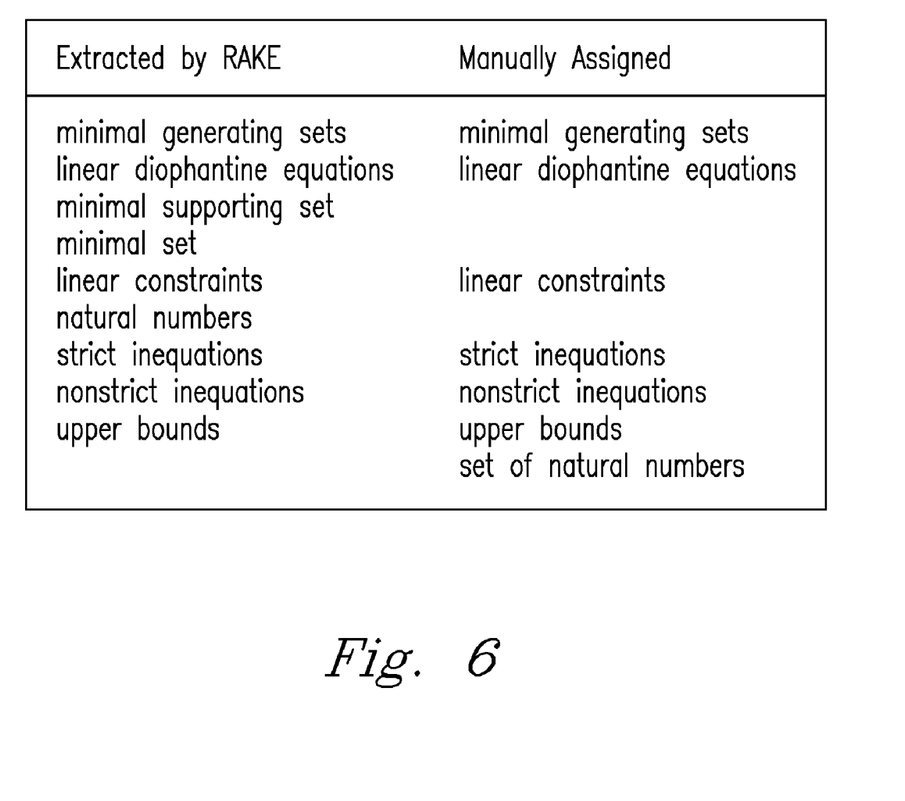
FIG. 6 is a table that lists the keywords extracted according to embodiments of the present invention compared to the sample abstract's manually assigned keywords.

After candidate keywords are scored, the top T scoring candidate keywords are selected and extracted as keywords for the document. In preferred embodiments, T is ⅓ the number of words in the co-occurrence graph (i.e., the number content words). The sample abstract contains 28 content words, resulting in T=9 keywords. FIG. 6 contains a table that lists the keywords extracted in the present example compared to the sample abstract's manually assigned keywords. We use the statistical measures precision, recall and F-measure to evaluate the accuracy of the keyword extraction. Out of the nine keywords extracted, six are true positives; that is they exactly match six of the manually assigned keywords. Although natural numbers is similar to the assigned keyword set of natural numbers, for the purposes of the benchmark evaluation it is considered a miss. There are, therefore, three false positives in the set of extracted keywords, resulting in a precision of 67%.

To evaluate performance, the present embodiment of the invention was tested against a collection of technical abstracts used in the keyword extraction experiments reported by Hulth (2003. "Improved automatic keyword extraction given more linguistic knowledge." *In Proceedings of the* 2003 *conference on Empirical methods in natural language processing* Volume 10, Association for Computational Linguistics) and by Mihalcea and Tarau (2004. TextRank: Bringing order into texts. In Proceedings of EMNLP. D. L. a. D. Wu. Barcelona, Spain, Association for Computational Linguistics: 404-411). The collection consists of 2000 Inspec abstracts for journal papers from Computer Science and Information Technology. The abstracts are divided into a training set with 1000 abstracts, a validation set with 500 abstracts, and a testing set with 500 abstracts. We followed the approach of Mihalcea and Tarau, using the testing set for evaluation because the present invention does not require a training set. Extracted keywords for each abstract are compared against the abstract's associated set of manually assigned uncontrolled keywords.

Figure 7:
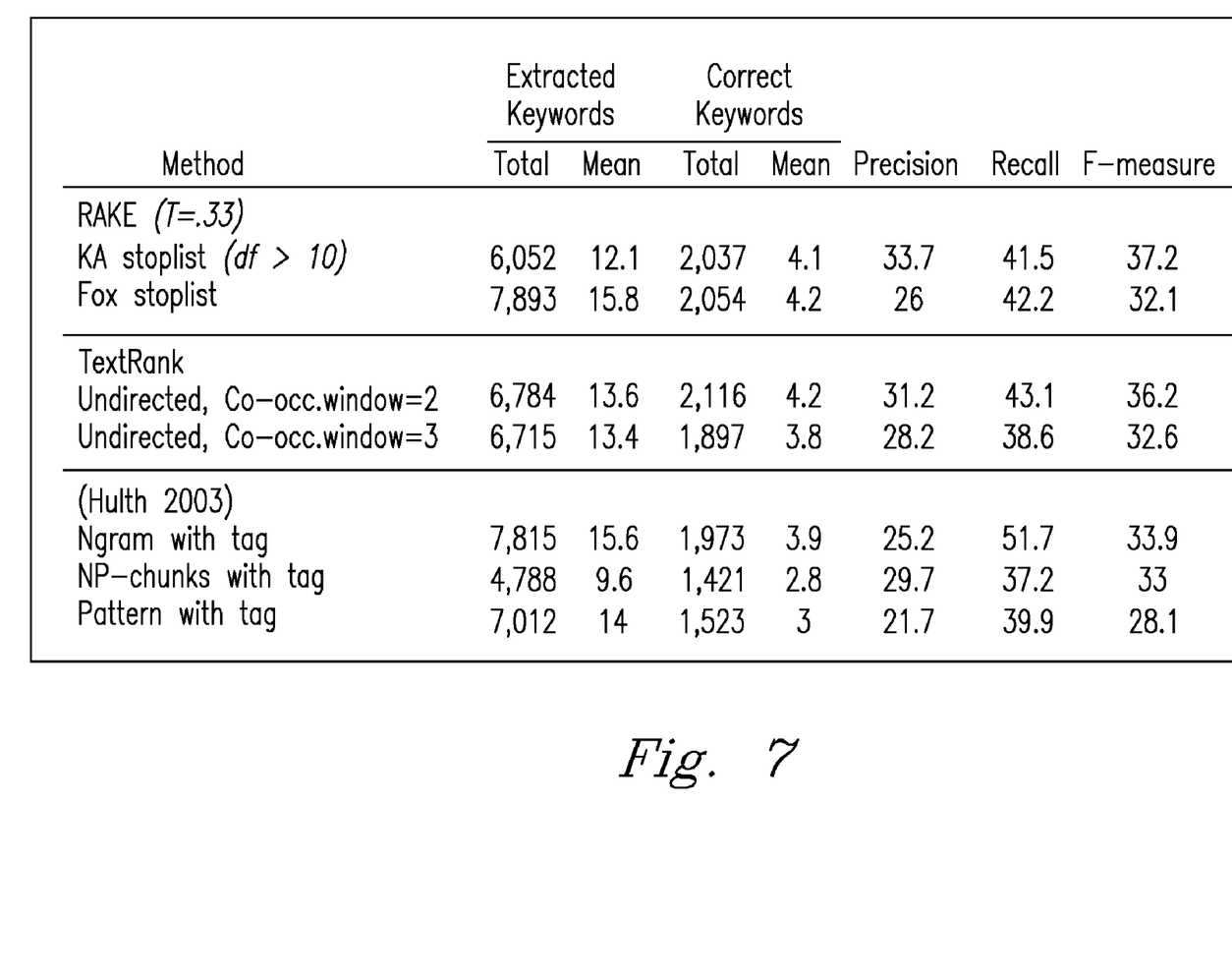
FIG. 7 is a table that compares the performance of embodiments of the present invention against alternatives.
Figure 8:
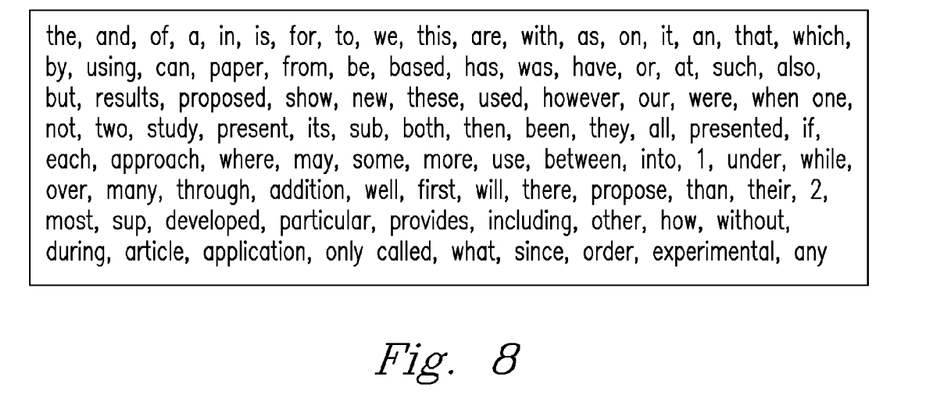
FIG. 8 a portion of words in a stop word list generated by keyword adjacency according to embodiments of the present invention.

FIG. 7 includes a table that details the performance of the present embodiment using a generated stop list, Fox's stoplist (Fox C 1989 "A Stop List for General Text. *SIGIR Forum* 24(1-2):19-21), and T as ⅓ the number of words in the co-occurrence graph. For each method, which corresponds to a row in the table, the following information is shown: the total number of extracted keywords and mean per abstract, the number of correct extracted keywords and mean per abstract; precision; recall; and F-measure. Results published by Huluth (Hulth A 2003 "Improved Automatic Keyword Extraction Given More Linguistic Knowledge. In *Proceedings of the* 2003 *conference on empirical methods in natural language processing* Volume 10, Association for Computational Linguistics) and by Mihalcea and Tarau are included for comparison. The highest values for precision, recall, and F-measure are shown in bold. As noted, perfect precision is not possible with any of the techniques as the manually assigned keywords do not always appear in the abstract text. The highest precision and F-measure is achieved using the present invention with a generated stoplist based on keyword adjacency, a subset of which is listed in FIG. 8. Stoplist generation based on keyword adjacency is described elsewhere herein with greater detail. With such a stoplist, the present embodiment yields the best results in terms of F-measure and precision, and provides comparable recall. With Fox's stoplist, the present embodiment achieves a high recall while experiencing a drop in precision.

Because of increasing interest in energy conservation in large data centers, we also evaluated the computational cost associated with extracting keywords according to embodiments of the present invention and compared it to Mihalcea and Tarau's TextRank. TextRank is a graph-based ranking model for text processing.

In the instant example, TextRank's damping factor, d, was set to 0.85 and its convergence threshold to 0.0001, as recommended by Mihalcea and Tarau. However, the particular syntactic filters referenced by Mihalcea and Tarau were not accessible, so it was not possible to evaluate their exact computational cost.

To minimize disparity in the comparison, all parsing stages in the respective extraction methods are identical, TextRank accumulates co-occurrences in a window of size 2, and the instant embodiment of the present invention accumulates word co-occurrences within candidate keywords. After co-occurrences are tallied, the algorithms compute keyword scores according to their respective methods. The benchmark was implemented in Java and executed in the Java SE Runtime Environment (JRE) 6 on a computer workstation.

We calculated the total time for the instant embodiment of the present invention and for TextRank (as an average over 100 iterations) to extract keywords from the Inspec testing set of 500 abstracts, after the abstracts were read from files and loaded in memory. The instant embodiment extracted keywords from the 500 abstracts in 160 milliseconds. TextRank extracted keywords in 1002 milliseconds, which is more than six times the amount of computational resources.

Figure 9:
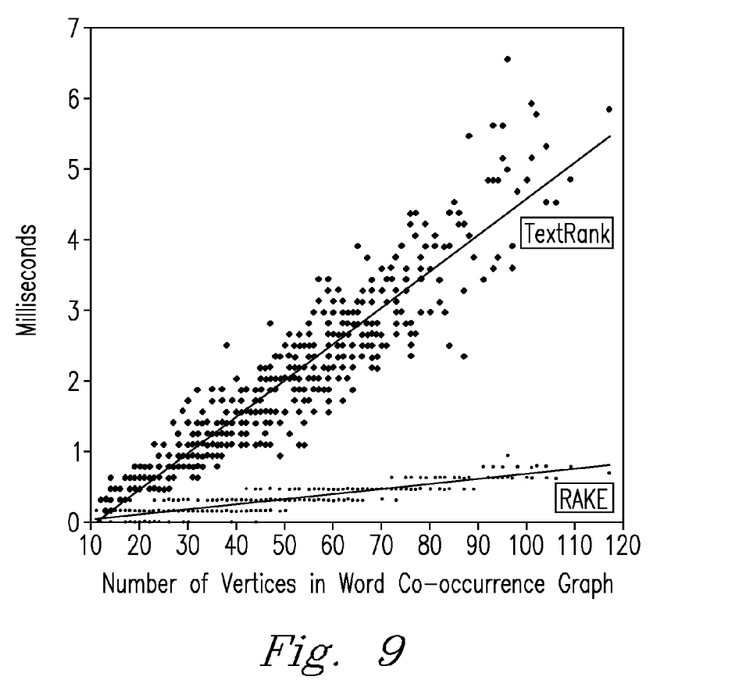
FIG. 9 is a plot of extraction time as a function of document size for both RAKE and TextRank approaches.
Figure 10:
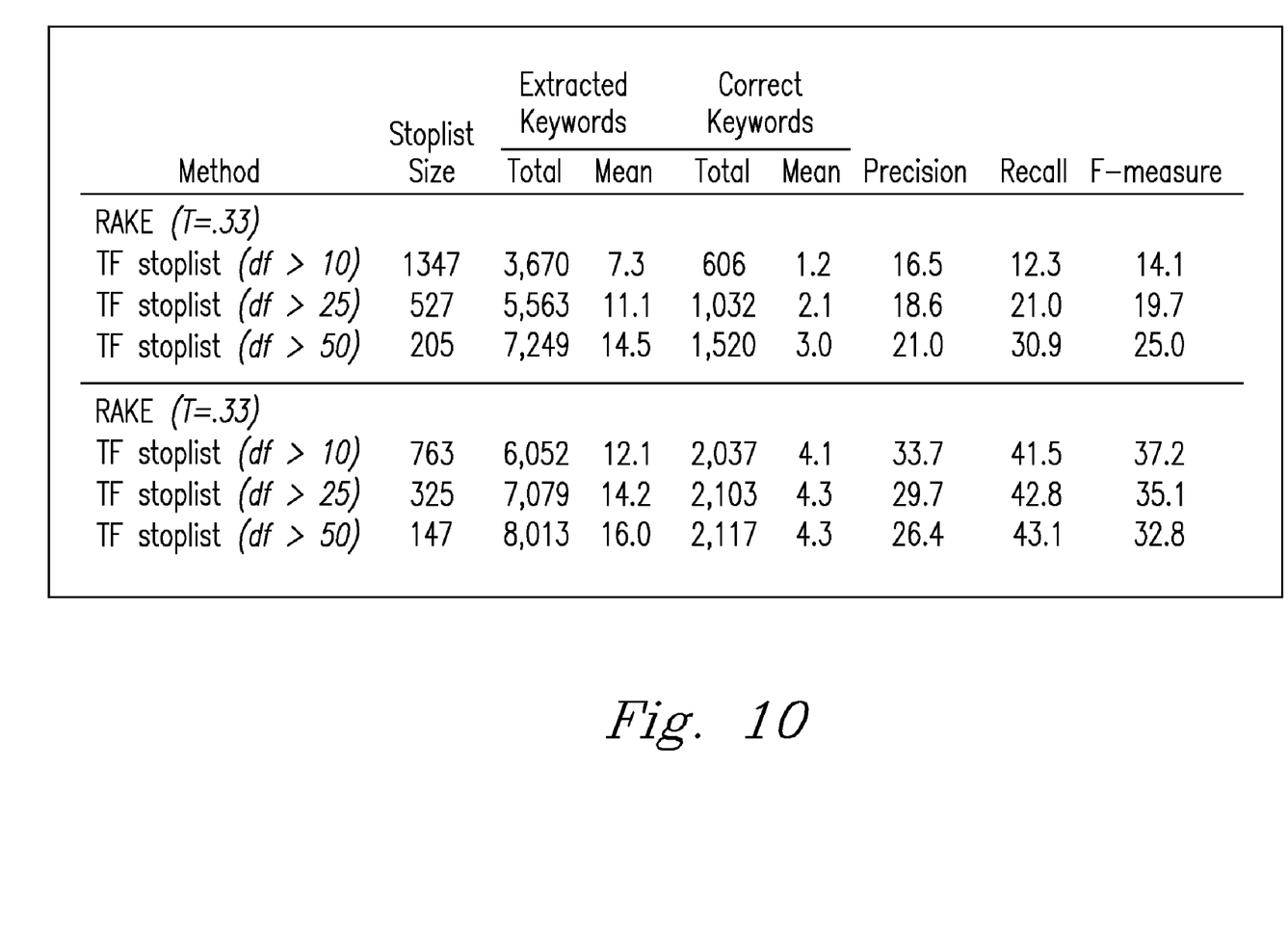
FIG. 10 is a table that lists the precision, recall, and F-measure for the keywords extracted according to various embodiments of the present invention.
Figure 11:
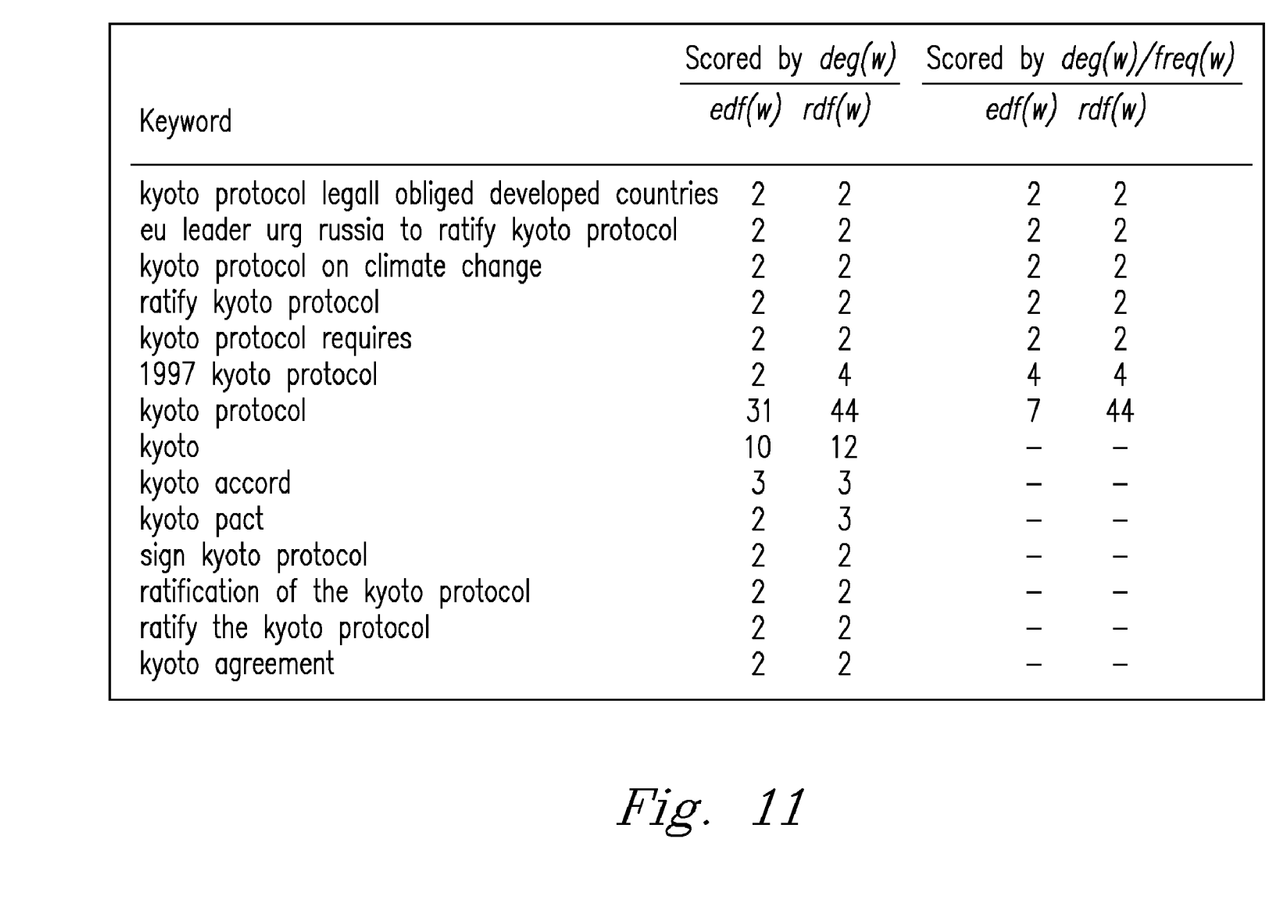
FIG. 11 is a table comparing various keyword score calculation approaches according to embodiments of the present invention.

Referring to FIG. 9, we can see that as the number of content words for a document increases, the performance advantage of embodiments of the present invention over TextRank increases. This is due to the ability of the present invention to score keywords in a single pass whereas TextRank requires repeated iterations to achieve convergence on word ranks.

The present invention can be applied in many different systems and applications. For example, an automatically generated stoplist can be used to configure embodiments of the present invention on particular corpora, domains, and languages. According to the present invention, the automatically generated stoplist can be created from a set of documents for which keywords are defined. Aspects of the stoplist generation is based on the intuition that words adjacent to, and not within, keywords are less likely to be meaningful and therefore are good choices for stop words.

In one example, a stop list was automatically generated by first identifying for each abstract in the Inspec training set the words occurring adjacent to words in the abstract's uncontrolled keyword list. The frequency of each word occurring adjacent to a keyword was accumulated across the abstracts. Words that occurred more frequently within keywords than adjacent to them were excluded from the stoplist.

To evaluate automatic stoplist generation of the present invention, six stoplists were generated, 3 of which select words for the stoplist by term frequency (TF), and 3 that select words by term frequency but also exclude words from the stoplist whose keyword frequency was greater than their keyword adjacency frequency (KA). We refer to this latter set of stoplists as keyword adjacency (KA) stoplists since they primarily include words that are adjacent to and not within keywords.

Each of the stoplists was set as the input stoplist for the previously described keyword extraction, which was then run on the testing set of the Inspec corpus of technical abstracts. The table in FIG. 10 c by each of these runs. The KA stoplists outperformed the TF stoplists generated by term frequency. A notable difference between results achieved using the two types of stoplists is evident; the F-measure improves as more words are added to a KA stoplist, whereas when more words are added to a TF stoplist the F-measure degrades. Furthermore, the best TF stoplist underperforms the worst KA stoplist. This indicates that the automatic stoplist generation of the present invention is adding the appropriate stop words and excluding content words from the stoplist.

Because the generated KA stoplists leverage manually assigned keywords, preferred applications would be within existing digital libraries or IR systems and collections where defined keywords exist or are easily identified for a subset of the documents. Stoplists only need to be generated once for particular domains enabling keyword extraction to be applied according to the present invention to new and future articles, facilitating annotation and indexing of new documents.

The keywords extracted according to embodiments of the present invention have been characterized to determine how well they represent the essential content within a corpus of documents for which keywords have not been manually assigned. The characterization included applying embodiments of the present invention to the Multi-Perspective Question Answering (MPQA) Corpus. The MPQA Corpus consists of 535 news articles provided by the Center for the Extraction and Summarization of Events and Opinions in Text (CERATOPS). Articles in the MPQA Corpus are from 187 different foreign and U.S. news sources and date from June 2001 to May 2002.

The keywords were extracted from title and text fields of documents in the MPQA Corpus and a minimum document threshold of 2 was set to focus on keywords that are associated with multiple documents. Candidate keyword scores were based on word scores as deg(w)/freq(w) and as deg(w). Calculating word scores as deg(w)/freq(w), 517 keywords were extracted that were referenced by an average of 4.9 documents. Calculating word scores as deg(w), 711 keywords were extracted that were referenced by an average of 8.1 documents.

This difference in average number of referenced document counts is the result of longer keywords having lower frequency across documents. The word score metric deg(w)/freq(w) favors longer keywords and therefore results in extracted keywords that occur in fewer documents in the MPQA Corpus. In many cases a subject is occasionally presented in its long form and more frequently referenced in its shorter form. For example, referring to the table in FIG. 11, kyoto protocol on climate change and 1997 kyoto protocol occur less frequently than the shorter kyoto protocol. The metric can also be set to score words by deg(w) in order to favor shorter keywords that occur across more documents.

Because most documents are unique within any given corpus, one can expect to find variability in what documents are essentially about as well as how each document represents specific subjects. While some documents may be primarily about the kyoto protocol, greenhouse gas emissions, and climate change, other documents may only make references to those subjects. Documents in the former set will likely have kyoto protocol, greenhouse gas emissions, and climate change extracted as keywords whereas documents in the latter set will not.

In many applications, users have a desire to capture all references to extracted keywords. Accordingly, counts can be accumulated on how often each extracted keyword is referenced by documents in the corpus. The referenced document frequency of a keyword, rdf(k), is the number of documents in which the keyword occurred as a candidate keyword. The extracted document frequency of a keyword, edf(k), is the number of documents from which the keyword was extracted.

A keyword that is extracted from all of the documents in which it is referenced can be characterized as exclusive or essential, whereas a keyword that is referenced in many documents but extracted from a few may be characterized as general. Comparing the relationship of edf(k) and rdf(k) provides one way to characterize the exclusivity of a particular keyword and can be defined as the keyword exclusivity exc(k) as shown in Equation 1.

$$exc(k) = \frac{edf(k)}{rdf(k)} \quad \text{Equation 1}$$

Of the 711 extracted keywords, 395 have an exclusivity score of 1, indicating that they were extracted from every document in which they were referenced. Within that set of 395 exclusive keywords, some occur in more documents than others and can therefore be considered more essential to the corpus of documents. A measure of how essential a keyword is can be defined as the essentiality of a keyword, ess(k), as shown in Equation 2.

$$ess(k) = exc(k) \times edf(k) \quad \text{Equation 2}$$

Figure 12:
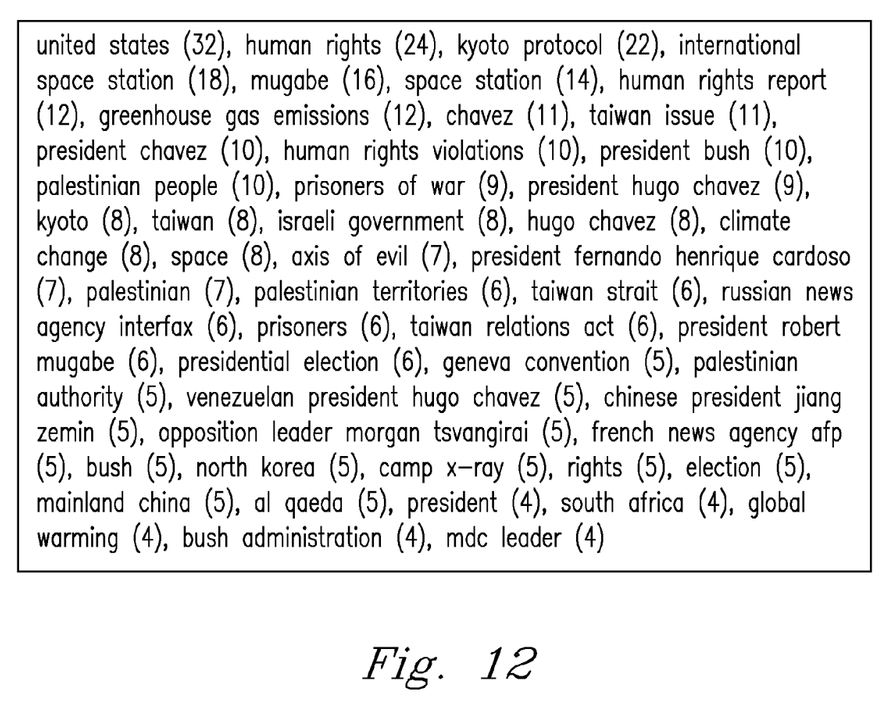
FIG. 12 is a listing of the top 50 essential keywords extracted from the MPQA corpus.
Figure 13:
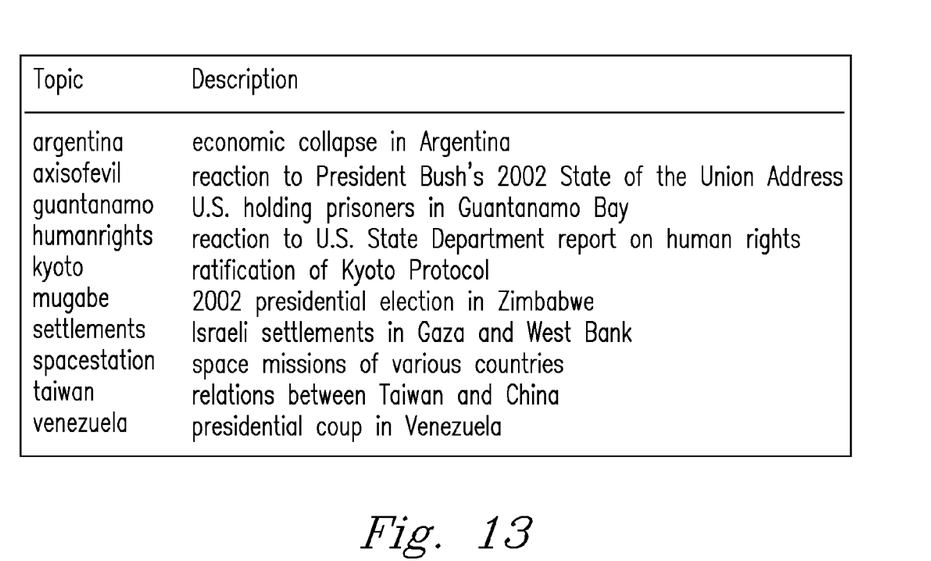
FIG. 13 is a table listing the 10 primary topics in the MPQA corpus.

FIG. 12 contains a listing of the top 50 essential keywords extracted from the MPQA corpus, listed in descending order by their ess(k) scores. According to CERATOPS, the MPQA corpus comprises 10 primary topics, listed in the table in FIG. 13, which are well represented by the 50 most essential keywords as extracted and ranked by embodiments of the present invention.

In addition to keywords that are essential to documents, keywords can also be characterized by how general they are to the corpus. In other words, how often was a keyword referenced by documents from which it was not extracted? In this case, the generality of a keyword, gen(k), can be defined as shown in Equation 3.

$$\text{gen}(k) = rdf(k) \times (1.0 - \text{exc}(k)) \qquad \text{Equation 3}$$

Figure 14:
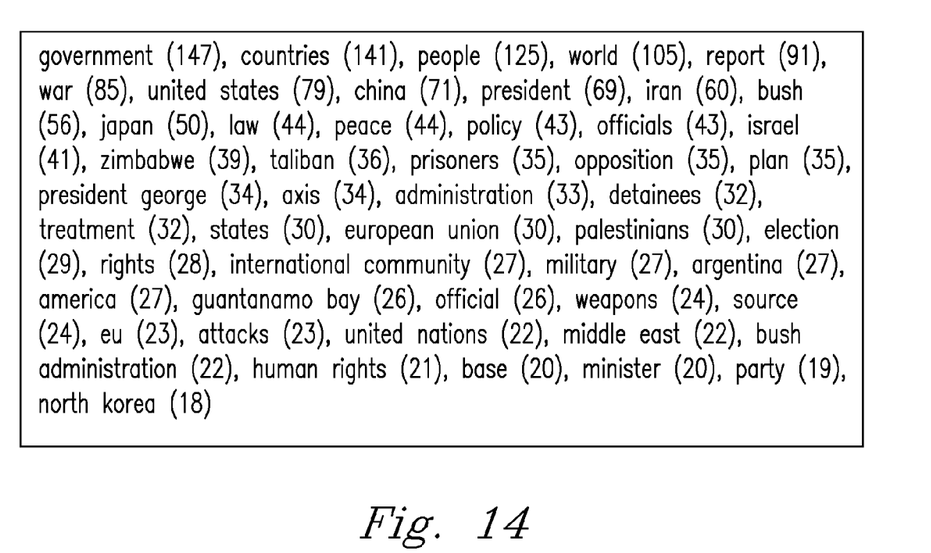
FIG. 14 is a listing of the top 50 keywords from the MPQA corpus extracted according to embodiments of the present invention.

FIG. 14 contains a listing of the top 50 general keywords extracted from the MPQA corpus in descending order by their gen(k) scores. It should be noted that general keywords and essential keywords are not necessarily mutually exclusive. Within the top 50 for both metrics, there are several shared keywords: united states, president, bush, prisoners, election, rights, bush administration, human rights, and north korea. Keywords that are both highly essential and highly general are essential to a set of documents within the corpus but also referenced by a significantly greater number of documents within the corpus than other keywords.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A computer-implemented method of extracting keywords from an individual document, the method comprising:
   Parsing an individual document by delimiters and stop words to identify candidate keywords;
   Determining co-occurrences of words within the candidate keywords;
   Calculating word scores for each word within the candidate keywords based on a function of co-occurrence degree, co-occurrence frequency, or both;
   Calculating a keyword score for each candidate keyword based on a function of word scores for words within the candidate keyword; and
   Selecting a portion of the candidate keywords to extract as keywords based, at least in part, on the candidate keywords with highest keyword scores.

2. The computer-implemented method of claim 1, wherein the individual document is part of a dynamic collection of documents.

3. The computer-implemented method of claim 1, further comprising storing the co-occurrences of words within a word co-occurrence graph.

4. The computer-implemented method of claim 1, wherein said calculating a keyword score for each candidate keyword comprises summing the word scores for each word within the candidate keywords.

5. The computer-implemented method of claim 1, wherein said selecting comprises selecting a number, T of the candidate keywords having highest keyword scores to extract as keywords.

6. The computer-implemented method of claim 5, where T is one third the number of candidate keywords.

7. The computer-implemented method of claim 1, further comprising identifying adjoining candidate keywords that adjoin one another at least twice in the individual document and in the same order, and creating a new candidate keyword from the adjoining candidate keywords and any interior stop words.

8. The computer-implemented method of claim 1, further comprising providing the keywords that have been extracted to an automatic stop word list generator and generating refined stop words.

9. The computer-implemented method of claim 8, further comprising repeating said parsing, said determining, said calculating word scores, said calculating keyword scores, and said selecting steps using the refined stop words.

10. The computer-implemented method of claim 8, wherein said generating refined stop words comprises:
    Providing the keywords and a corpus of documents comprising a plurality of said individual documents;
    Constructing a word list of all words in the corpus of documents;
    Determining the keyword adjacency frequency of words in the corpus of documents;
    Determining the keyword frequency in the corpus of documents;
    Excluding words from the word list if the ratio of keyword adjacency frequency to keyword frequency is less than a predetermined value; and
    Truncating the word list based on a predetermined criteria to form the stop word list.

11. A system for extracting keywords from an individual document, the system comprising:
    A storage device, a communications interface, or both providing at least one individual document; and
    A processor programmed to:
      Parse the individual document by delimiters and stop words to identify candidate keywords;
      Determine co-occurrences of words within the candidate keywords;
      Calculate word scores for each word within the candidate keywords based on a function of co-occurrence degree, co-occurrence frequency, or both;
      Calculate a keyword score for each candidate keyword based on a function of word scores for words within the candidate keyword; and
      Select a portion of the candidate keywords to extract as keywords based, at least in part, on the candidate keywords with highest keyword scores.

12. The system of claim 11, wherein the communications interface provides a plurality of individual documents as part of a dynamic collection of documents.

13. The system of claim 11, wherein the co-occurrences of words are stored within a co-occurrence graph.

14. The system of claim 11, wherein the keyword score is calculated for each candidate keyword and comprises a sum of the word scores for each word within the candidate keywords.

15. The system of claim 11 wherein the portion of candidate keywords to extract is equivalent to one third the number of candidate keywords.

16. The system of claim 11, wherein the processor is further programmed to identify adjoining candidate keywords that adjoin one another at least twice in the individual document and in the same order, and to create a new candidate keyword from the adjoining candidate keywords and any interior stop words.

17. The system of claim 11, wherein the processor is further programmed to provide keywords that have been extracted to an automatic stop word list generator and to generate refined stop words.

18. The system of claim 17, wherein the processor is further programmed to parse, to determine, to calculate word scores, to calculate a keyword score, and to select again using the refined stop words.

19. The system of claim 17, wherein the automatic stop word list generator comprises processor-executable instructions to:
    Provide the keywords and a corpus of documents comprising a plurality of said individual documents;

Construct a word list of all words in the corpus of documents;

Determine the keyword adjacency frequency of words in the corpus of documents;

Determine the keyword frequency in the corpus of documents;

Exclude words from the word list if the ratio of keyword adjacency frequency to keyword frequency is less than a predetermined value; and Truncate the word list based on a predetermined criteria to form the stop word list.

* * * * *